United States Patent
Kurata et al.

(10) Patent No.: US 11,469,581 B2
(45) Date of Patent: Oct. 11, 2022

(54) RESIN STRUCTURE

(71) Applicant: Yazaki Corporation, Tokyo (JP)

(72) Inventors: Sho Kurata, Makinohara (JP); Hideki Kawamura, Makinohara (JP); Minoru Umezaki, Makinohara (JP); Ko Fujimoto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 409 days.

(21) Appl. No.: 16/787,249

(22) Filed: Feb. 11, 2020

(65) Prior Publication Data
US 2020/0295550 A1 Sep. 17, 2020

(30) Foreign Application Priority Data
Mar. 11, 2019 (JP) .............................. JP2019-044088

(51) Int. Cl.
*H02G 3/08* (2006.01)
*B60R 16/02* (2006.01)

(52) U.S. Cl.
CPC .............. *H02G 3/088* (2013.01); *B60R 16/02* (2013.01)

(58) Field of Classification Search
CPC ..................................................... H02G 3/088
See application file for complete search history.

(56) References Cited

U.S. PATENT DOCUMENTS

| 9,241,417 | B2 * | 1/2016 | Soh ........................ | H05K 7/026 |
| 2003/0136780 | A1 * | 7/2003 | Sato ...................... | H02G 3/088 |
| | | | | 220/849 |

FOREIGN PATENT DOCUMENTS

JP        2017-022824 A        1/2017

* cited by examiner

*Primary Examiner* — Sung H Pak
(74) *Attorney, Agent, or Firm* — Sughrue Mion, PLLC (57) ABSTRACT

A resin structure includes a first resin body, and a second resin body. The second resin body is fit to an outer surface of the first resin body while being slid to one side in a sliding direction along the outer surface of the first resin body. The first resin body and the second resin body form a water stop structural unit extending in the sliding direction in a state where the second resin body is fit to the first resin body. The water stop structural unit includes a first water stop structure in a first region located at the one side in the sliding direction, and a second water stop structure in a second region located at the other side in the sliding direction with respect to the first region.

2 Claims, 11 Drawing Sheets

RESIN STRUCTURE

CROSS REFERENCE TO RELATED APPLICATIONS

This application claims priority from Japanese Patent Application No. 2019-044088 filed on Mar. 11, 2019, the entire contents of which are incorporated herein by reference.

BACKGROUND OF THE INVENTION

Field of the Invention

The present invention relates to a resin structure.

Description of Related Art

A resin structure formed by assembling a plurality of resin bodies to each other, such as a relay box (electric connection box) mounted on a vehicle, is widely known in related art (for example, see Patent Literature 1 JP-A-2017-022824).
[Patent Literature 1] JP-A-2017-022824

When forming the resin structure as described above, for example, a second resin body may be attached to an outer surface of a first resin body while the second resin body is slid along the outer surface of the first resin body. In the resin structure having a structure corresponding to such assembly, in order to stop water from an assembling portion of the first resin body and the second resin body, for example, both of the resin bodies may be fit in a state of being pressed and brought into contact with each other. In this case, when both resin bodies are made to adhere more firmly for the purpose of increasing the water stop property, a force required to push the second resin body into the first resin body is usually increased accordingly, and workability tends to be lowered. In other words, it is difficult to achieve both of the water stop property between these two resin bodies and workability when assembling these two resin bodies.

SUMMARY

One or more embodiments provide a resin structure whose workability when assembling a second resin body to an outer surface of a first resin body while the second resin body is slid along the outer surface of the first resin body, and water stop property of an assembling portion between the first resin body and the second resin body can be both achieved.

In an aspect (1), a resin structure includes a first resin body, and a second resin body. The second resin body is fit to an outer surface of the first resin body while being slid to one side in a sliding direction along the outer surface of the first resin body. The first resin body and the second resin body form a water stop structural unit extending in the sliding direction in a state where the second resin body is fit to the first resin body. The water stop structural unit includes a first water stop structure in a first region located at the one side in the sliding direction, and a second water stop structure in a second region located at the other side in the sliding direction with respect to the first region. A water stop surface extending in the sliding direction and provided on one of the first resin body and the second resin body and a water stop rib extending in the sliding direction and provided on the other of the first resin body and the second resin body are press contacted, in the first water stop structure. A first water stop plate extending in the sliding direction and provided in the other resin body is fit into a first groove extending in the sliding direction and provided in the one resin body, in the second water stop structure.

In an aspect (2), the water stop structural unit may further comprise a third water stop structure in the first region. A second water stop plate extending in the sliding direction and provided in the other resin body may be fit into a second groove extending in the sliding direction and provided in the one resin body, in the third water stop structure.

According to the aspect (1), in the state where the second resin body is fit to the first resin body, the first resin body cooperates with the second resin body to form the water stop structural unit extending in the sliding direction. In the first region located at one side (that is, a front side in the sliding direction when the second resin body is fit) in the sliding direction in the water stop structural unit, the water stop function is exhibited by the water stop rib in press contact with the water stop surface (hereinafter referred to as "first water stop structure by press contact"). In the second region located at the other side (that is, a rear side in the sliding direction when the second resin body is fit) in the sliding direction in the water stop structural unit, the water stop function is exhibited by a labyrinth structure in which the first water stop plate enters the first groove so that a water entering path (so-called creeping distance) is lengthened (hereinafter referred to as "second water stop structure by ensuring the creeping distance").

In general, when the second water stop structure by securing the creeping distance is adopted, the water stop property of an assembling portion of the first resin body and the second resin body is increased since the water entering path (creeping distance) is lengthened as compared with the case where the first water stop structure by press contact is adopted. On the other hand, when the second water stop structure by securing the creeping distance is adopted, it is necessary to adjust the relative position and relative posture of the resin bodies so as to allow the first water stop plate to enter the first groove, and it is difficult, to improve workability. On the contrary, when the first water stop structure by press contact is adopted, the workability when assembling the resin bodies is easily improved as compared with the case where the second water stop structure by securing the creeping distance is adopted.

Further, when the first water stop structure by press contact on one side (front side, back side) of the sliding direction is adopted, the second resin body is easier to be fit to the first resin body (for example, easier to push in), and the workability when assembling the resin bodies is easily improved as compared with the case where the second water stop structure by securing the creeping distance on one side (front side, back side) of the sliding direction is adopted.

From the above, the resin structure having the configuration described above can achieve both workability when assembling the second resin body to the outer surface of the first resin body while the second resin body is slid along the outer surface of the first resin body, and water stop property of the assembling portion between the first resin body and the second resin body.

According to the aspect (2), the third water stop structure by the second groove and the second water stop plate is added in the first region where the first water stop structure by the press contact that tends to be inferior in water stop property is adopted. As a result, the water stop property of the first region of the water stop structural unit is improved, and the water stop property in the entire water stop structural unit can be further increased.

According to one or more embodiments, it is possible to provide a resin structure whose workability when assembling a second resin body to an outer surface of a first resin body while the second resin body is slid along the outer surface of the first resin body, and water stop property of an assembling portion between the first resin body and the second resin body can be both achieved.

The present invention is briefly described above. Details of the present invention will become clearer by reading through an embodiment for implementing the present invention to be described below with reference to the accompanying drawings.

DETAILED DESCRIPTION

Embodiment

Hereinafter, a resin structure 1 according to an embodiment of the present invention shown in FIG. 1 will be described with reference to the drawings. The resin structure 1 is typically a relay box (electric connection box) that is mounted on a vehicle and accommodates electronic components such as a relay. When the resin structure 1 is mounted on the vehicle, a near side (lower left side in FIG. 1) and a far side (upper right side in FIG. 1) in FIG. 1 correspond to a front side and a rear side of the vehicle, respectively.

Figure 1:
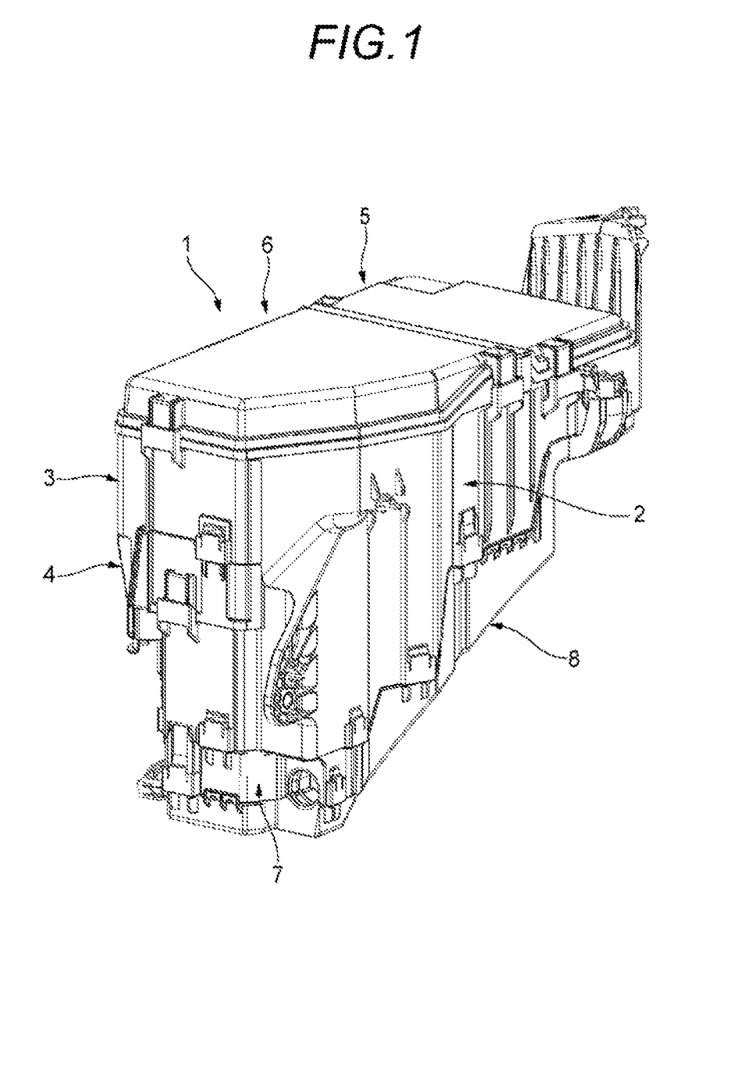
FIG. 1 is a perspective view of a resin structure according to an embodiment.
Figure 2:
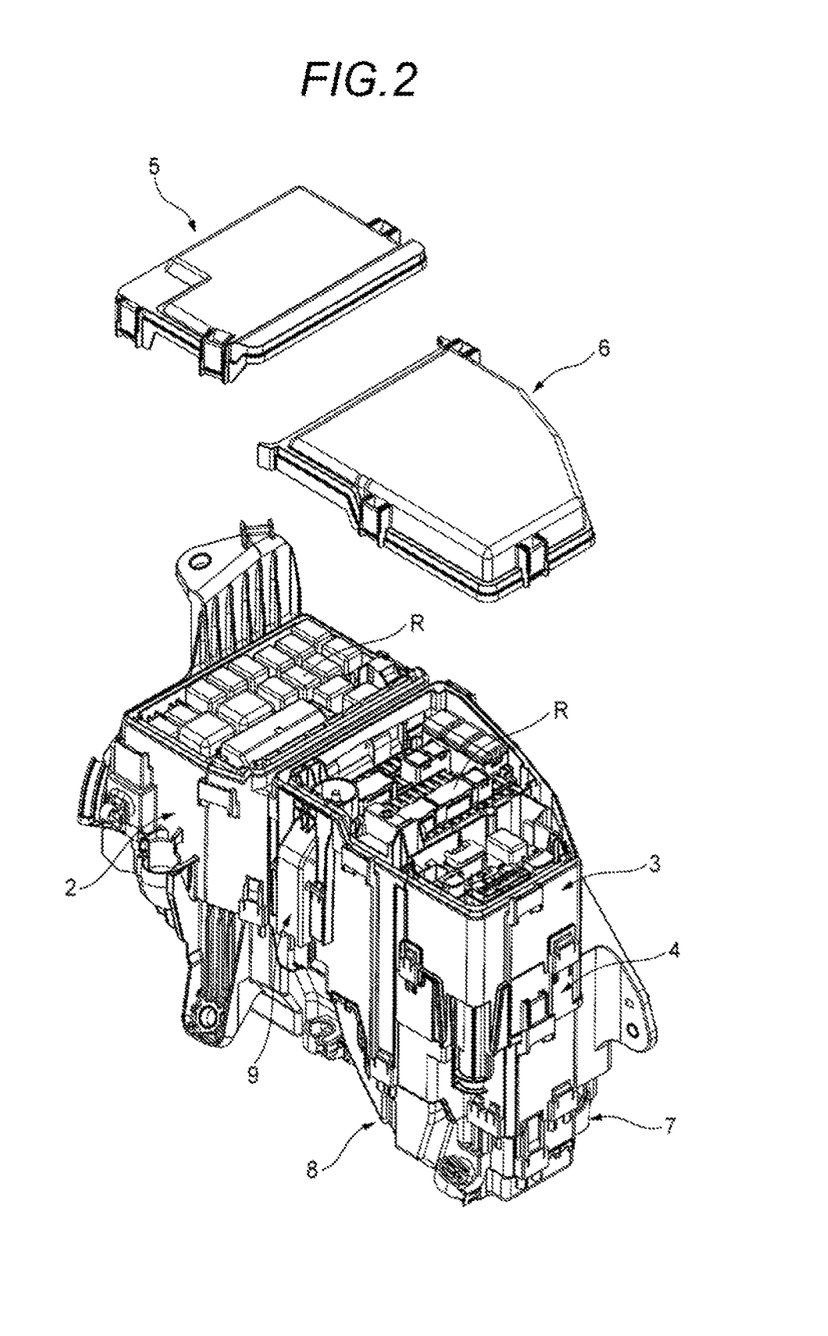
FIG. 2 is a perspective view showing the resin structure in which only a first upper cover and a second upper cover are disassembled.

As shown in FIGS. 1 and 2, the resin structure 1 includes a frame 2, a first front cover 3 and a second front cover 4 fit to an upper part of the frame 2 at a vehicle front side, a first upper cover 5 fit to the frame 2 from above so as to close an upper end opening of the frame 2 in a vehicle rear side region, a second upper cover 6 fit to the frame 2 and the first front cover 3 from above so as to close an upper end opening of the first front cover 3 and the frame 2 in a vehicle front side region, an under cover 7 fit a lower part of the frame 2 at a vehicle front side, a lower cover 8 fit to the frame 2 and the under cover 7 from below so as to close a lower end opening of the frame 2 and the under cover 7 and a side cover 9 fit to an outer surface (side surface) of the frame on one side in a left-right direction of the vehicle. All of the eight components configuring the resin structure 1 are resin molded bodies.

As shown in FIG. 2, an electronic component (and other components) R such as a relay is accommodated in the frame 2 and the first front cover 3 and the second front cover 4). The present invention relates to the structure of the frame 2 and the side cover 9 in the resin structure 1. Therefore, the structure of only the frame 2 and the side cover 9 will be described in detail below.

Figure 3:
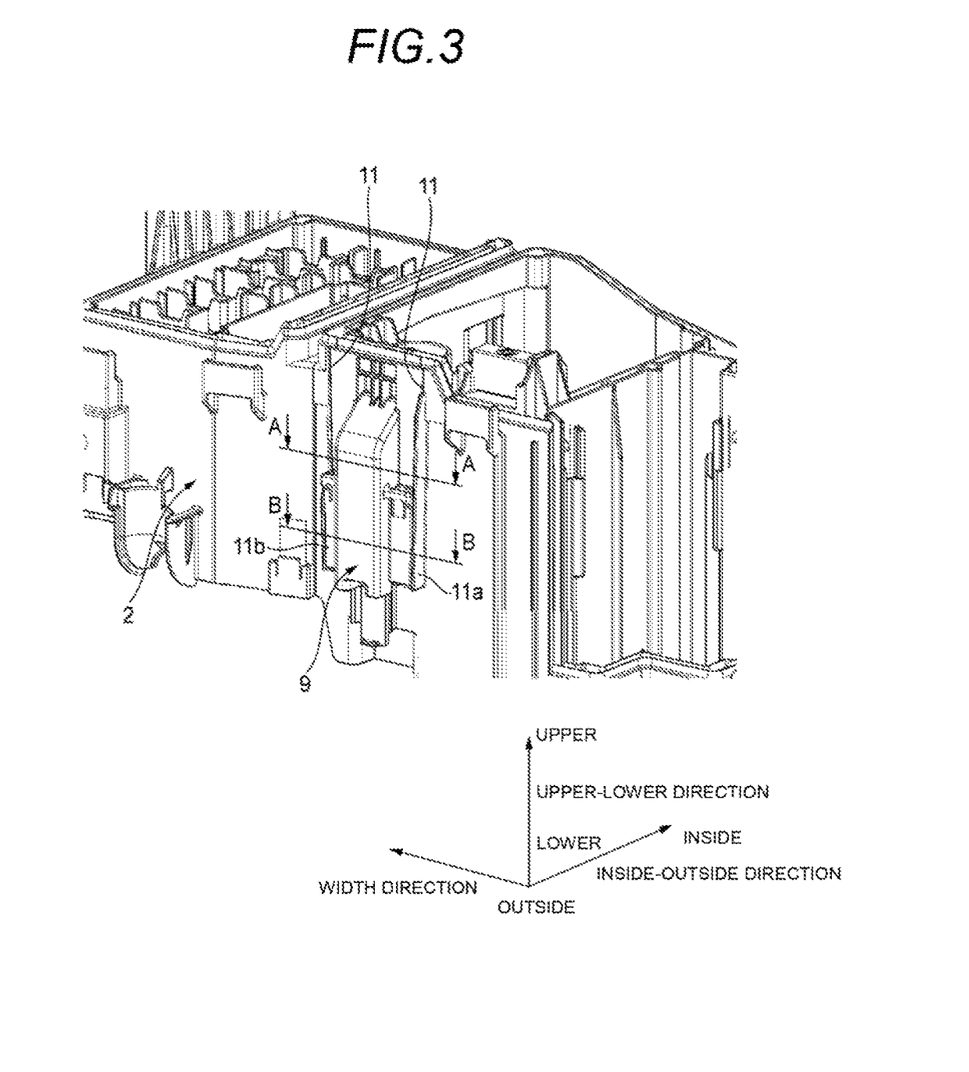
FIG. 3 is an enlarged perspective view showing a state in which a side cover is fit to an outer surface of a frame.

Hereinafter, as shown in FIG. 3, an "inside-outside direction", a "width direction", an "upper-lower direction", as well as "inside", "outside", "upper" and "lower" directions are defined for easy description. The "inside-outside direction", the "width direction", and the "upper-lower direction" are orthogonal to one another. When the resin structure 1 is mounted on a vehicle, the "inside-outside direction", the "width direction", and the "upper-lower direction" correspond to the left-right direction, the front-rear direction and the upper-lower direction of the vehicle.

The side cover 9 is fit to the outer surface of the frame 2 by sliding downward along the outer surface of the frame 2. Therefore, the "upper-lower direction" corresponds to a sliding direction of the side cover 9. A space defined between the side cover 9 fit to the outer surface of the frame 2 and an inner surface of the frame 2 is typically used as a space for accommodating components (not shown) such as terminals.

Figure 4:
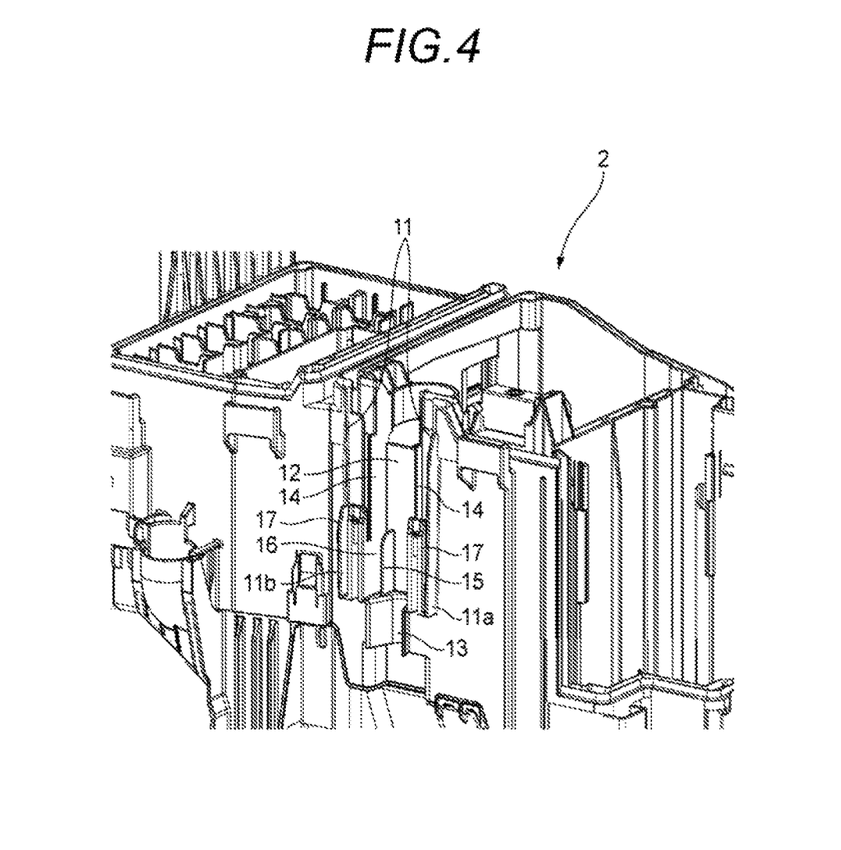
FIG. 4 is an enlarged perspective view showing a portion in the frame to which the side cover is fit.
Figure 5:
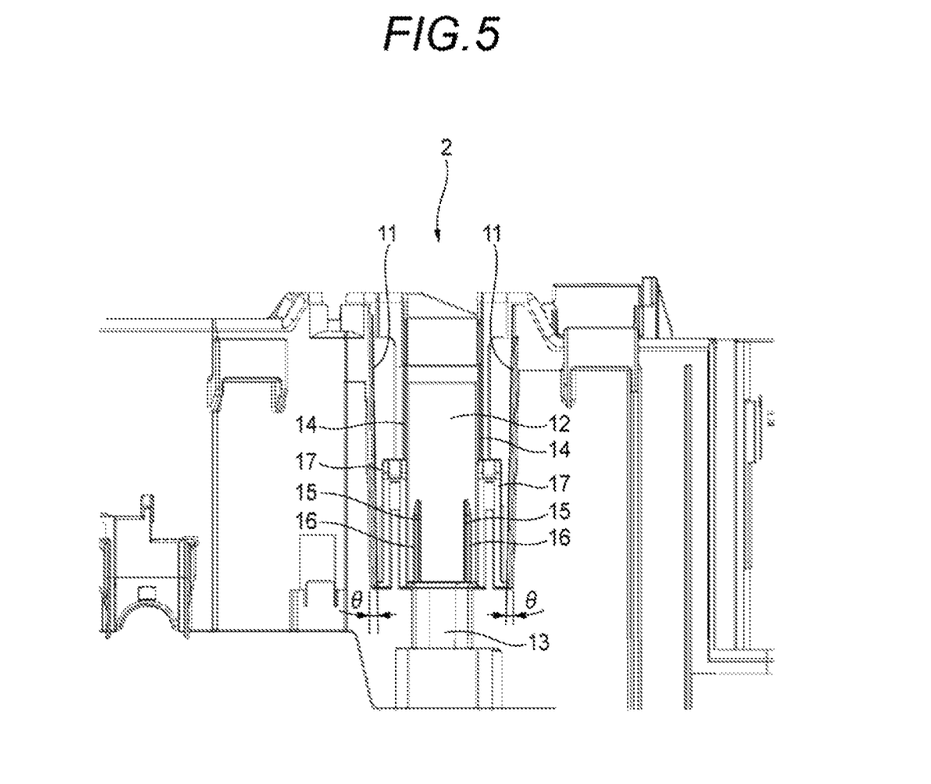
FIG. 5 is an enlarged side view showing the portion in the frame to which the side cover is fit.

First, the frame 2 will be described. As shown in FIGS. 1 to 5, the frame 2 configures most of the appearance of a side surface of the resin structure 1. As shown in FIGS. 3 to 5, a pair of facing surfaces 11 is formed, at the position where the side cover 9 is fit to the frame 2, on the outer surface of the frame 2, and is spaced apart from each other in the width direction and faces each other in the width direction. When assembling the side cover 9, a pair of end edge portions 31 (see FIG. 6 or the like) to be described later of the side cover 9 comes into press contact with the pair of facing surfaces 11.

As shown in FIG. 5, each of the pair of facing surfaces 11 is a flat surface extending while inclining by an angle θ with respect to the upper-lower direction so that a distance between the facing surfaces 11 gradually decreases toward the lower side. The angle θ is a value larger than a so-called "draft angle" that is usually provided in order to improve the die-cutting property when molding a resin molded body using a die. In other words, the pair of facing surfaces 11 intentionally designed to be inclined by the angle θ which is larger than a general draft angle is inclined more largely than a pair of water stop plates 25 (see FIG. 8 or the like) that usually have only an inclination of an angle corresponding to the draft angle (which can be said to be substantially parallel to the upper-lower direction). The angle θ is not particularly limited as long as it is determined in consideration of the workability of assembling, water stop property, and the like, but is 3 degrees or more and 5 degrees or less as an example.

In the present embodiment, a pair of water stop plates 11a and 11b that protrude from the outer surface of the frame 2 further to the outside is provided continuously from the pair of facing surfaces 11 in order to improve the water stop property. As can be understood from FIGS. 3 and 4, in the present embodiment, for the pair of water stop plates 11a and 11b, the water stop plate 11a on the right side in FIGS. 3 and 4 (corresponding to the front side of the vehicle) is provided across the entire region of the corresponding, facing surface 11 in the upper-lower direction, while the water stop plate 11b on the left side in FIGS. 3 and 4 (corresponding to the rear side of the vehicle) is provided only in a lower region of the corresponding facing surface 11 in the upper-lower direction. This is based on the idea of more reliably preventing water from entering from the front of the vehicle.

In a region between the pair of facing surfaces 11 on the outer surface of the frame 2, a component accommodating portion 12 that is recessed to the inside and extends in the upper-lower direction is provided. The component accommodating portion 12 extends in the upper-lower direction corresponding to the entire region of the pair of facing surfaces 11 in the upper-lower direction. The component accommodating portion 12 is used as a part of the space for accommodating components such as terminals.

At a lower end portion of the component accommodating portion 12, an electric wire accommodating portion 13 that is recessed to the inside and extends in the upper-lower direction is provided so as to communicate with the component accommodating portion 12 in the upper-lower direction. The electric wire accommodating portion 13 is used as a part of the space for accommodating electric wires extending downward from the components such as terminals.

Figure 10:
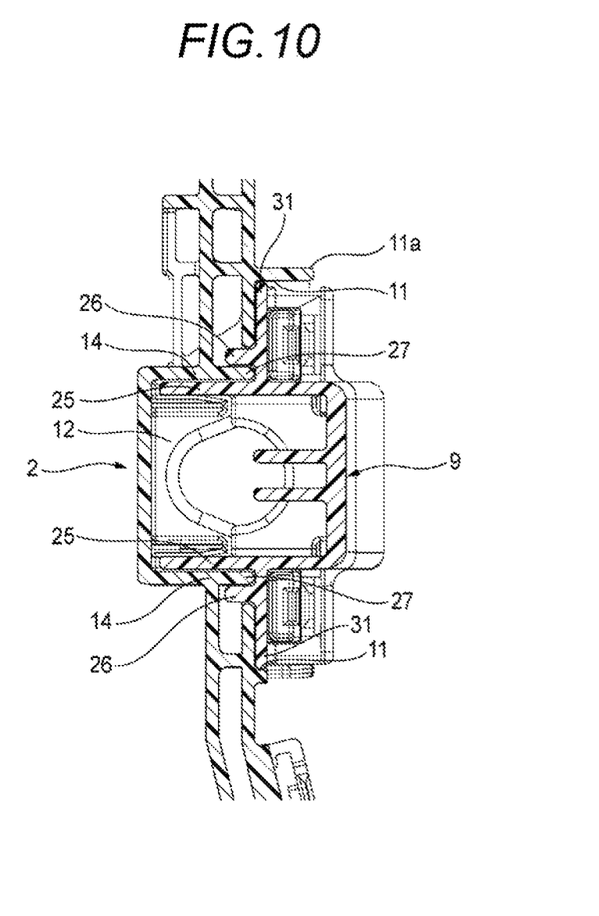
FIG. 10 is a cross-sectional view taken along a line A-A in FIG. 3.
Figure 11:
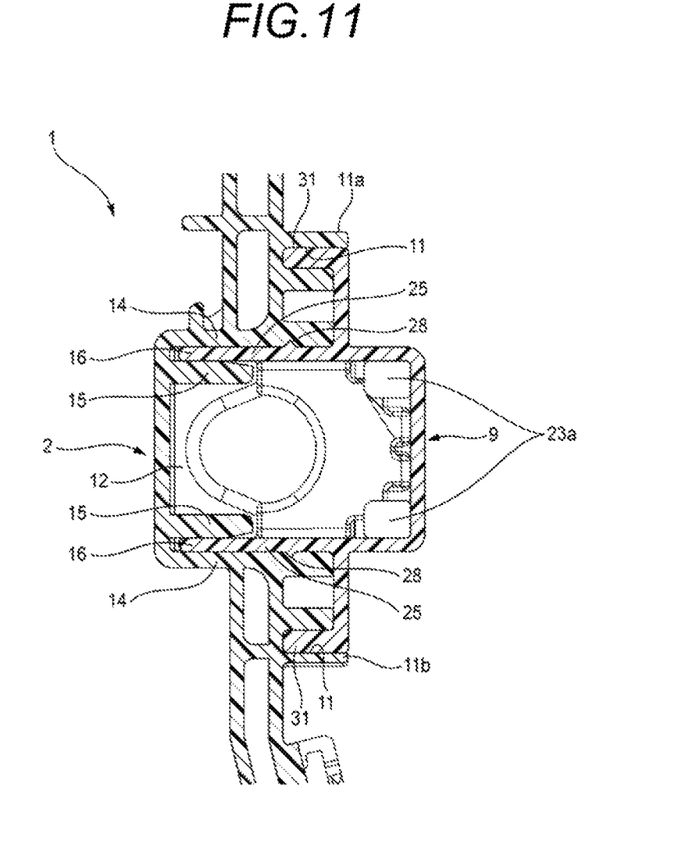
FIG. 11 is a cross-sectional view taken along a line B-B in FIG. 3.

On both side portions in the width direction of the component accommodating portion 12, a pair of water stop plates 14 protrudes to the outside from the outer surface of the frame 2 continuously from inner wall surfaces on both sides in the width direction of the component, accommodating portion 12 and extends in the upper-lower direction (also see FIGS. 10 and 11). The pair of water stop plates 14 extends in the upper-lower direction corresponding to the entire region of the component accommodating portion 12 (that is, the pair of facing surfaces 11) in the upper-lower direction.

A pair of water stop plates 15 is provided inside the component accommodating portion 12 at a position away from the pair of water stop plates 14 by a predetermined distance toward the inside in the width direction. The pair of water stop plates 15 protrudes to the outside from a bottom surface of the component accommodating portion 12 and extends in the upper-lower direction corresponding to only a lower region of the pair of water stop plates 14. As a result, a pair of grooves 16 that open to the outside and extend in the upper-lower direction are formed between the pair of water stop plates 14 and the pair of water stop plates 15 in the lower region of the pair of water stop plates 14 (also see FIG. 11).

A pair of locking pieces 17 that protrude toward the upper side is integrally provided with the pair of water stop plates 14 in the lower region of the pair of water stop plates 14 between the pair of facing surfaces 11 and the pair of water stop plates 14. When assembling the side cover 9, the pair of locking pieces 17 is inserted to through holes 29a of a pair of locking portions 29 on the side cover 9 to be described below.

Figure 8:
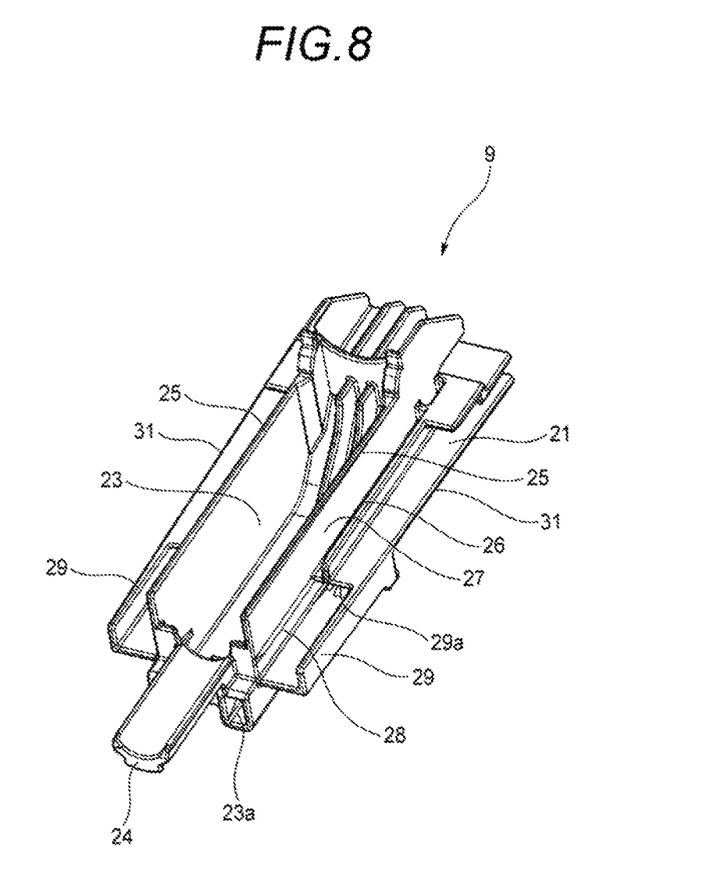
FIG. 8 is a perspective view of the side cover as seen from the inside.
Figure 9:
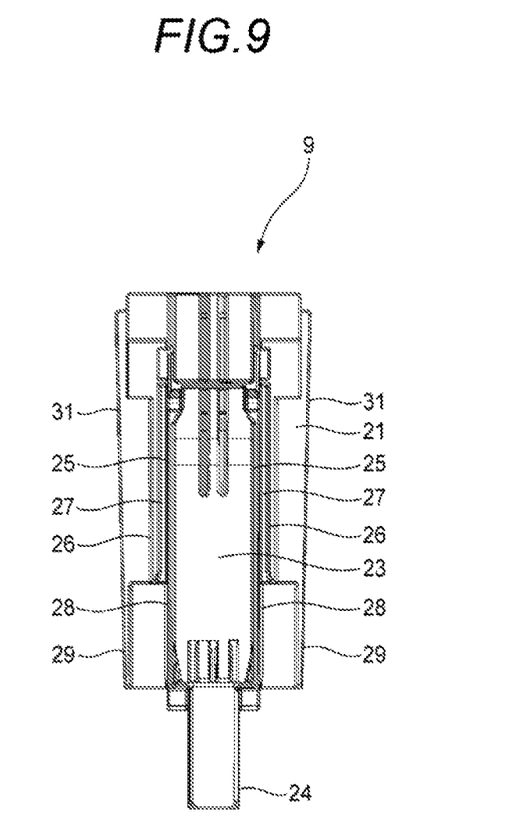
FIG. 9 is a plan view of the side cover as seen from the inside.

Next, the side cover 9 will be described. As shown in FIGS. 6 to 9, the side cover 9 includes a flat plate portion 21 having, a substantially rectangular flat plate shape. The raised portion 22 that protrudes to the outside and extends in the upper-lower direction is formed at the center portion in the width direction of the flat plate portion 21. The raised portion 22 extends further to the lower side from a lower end edge of the flat plate portion 21. As shown in FIGS. 8 and 9, a component accommodating portion 23 that is recessed to the outside and extends in the upper-lower direction is formed in an inner surface side of the raised portion 22. A pair of drain holes 23a penetrating in the upper-lower direction is formed at a lower end portion of the component accommodating portion 23 (see FIGS. 8 and 11).

An electric wire accommodating portion 24 is connected to the lower end portion of the component accommodating portion 23 so as to protrude to the lower side. When the side cover 9 is fit, the component accommodating portion 23 and the electric wire accommodating portion 24 cooperate with the component accommodating portion 12 and the electric wire accommodating portion 13 of the frame 2 separately, so as to define the space for accommodating components such as terminals and the space for accommodating electric wires extending from the components.

On both side portions in the width direction of the component accommodating portion 23, a pair of water stop plates 25 protrudes to the inside from the inner surface of the flat plate portion 21 continuously from inner wall surfaces on both sides in the width direction of the component accommodating portion 23 and extends in the upper-lower direction (also see FIGS. 10 and 11).

A pair of water stop plates 26 is provided on the flat plate portion 21 at a position away from the pair of water stop plates 25 by a predetermined distance toward the outside in the width direction. The pair of water stop plates 26 protrudes to the inside from an inner surface of the flat plate portion 21 and extends in the upper-lower direction corresponding to only an upper region of the pair of water stop plates 25. The pair of water stop plates 26 extends toward the lower side to the lower end edge of the flat, plate portion 21. As a result, a pair of grooves 27 that open to the inside and extend in the upper-lower direction are formed between the pair of water stop plates 25 and the pair of water stop plates 26 in the upper region of the pair of water stop plates 25 (also see FIG. 10).

A pair of water stop ribs 28 that protrude to the outside in the width direction and extend in the upper-lower direction are formed at regions lower than the pair of water stop plates 26 on the outer side surface in the width direction of the pair of water stop plates 25 (also see FIG. 11).

The pair of locking portions 29 is integrally provide with the pair of water stop plates 25 so as to extend to the lower side from the lower end edge of the flat plate portion 21 at an outer surface side of lower end portions on both sides in the width direction of the flat plate portion 21. In the pair of locking portions 29, a pair of through holes 29a penetrating in the upper-lower direction is formed.

Figure 6:
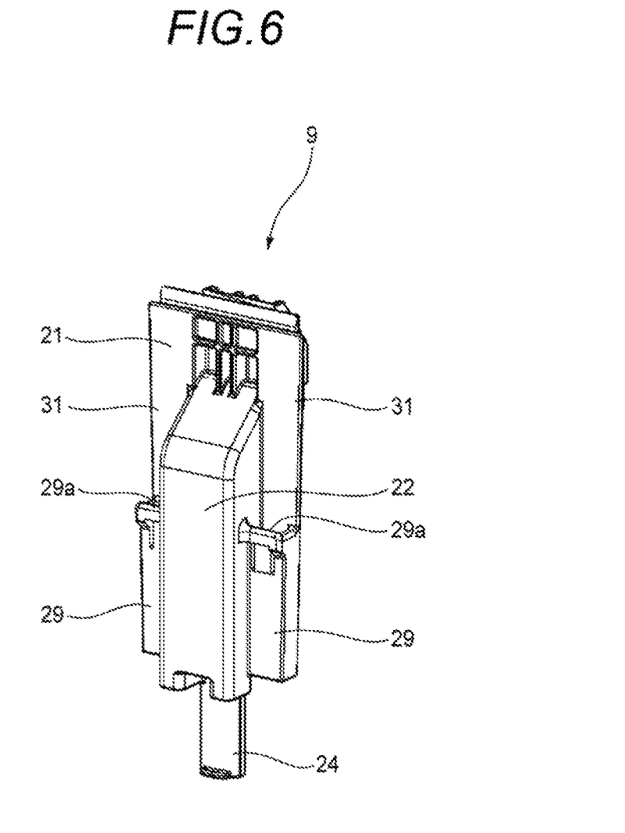
FIG. 6 is a perspective view of the side cover.
Figure 7:
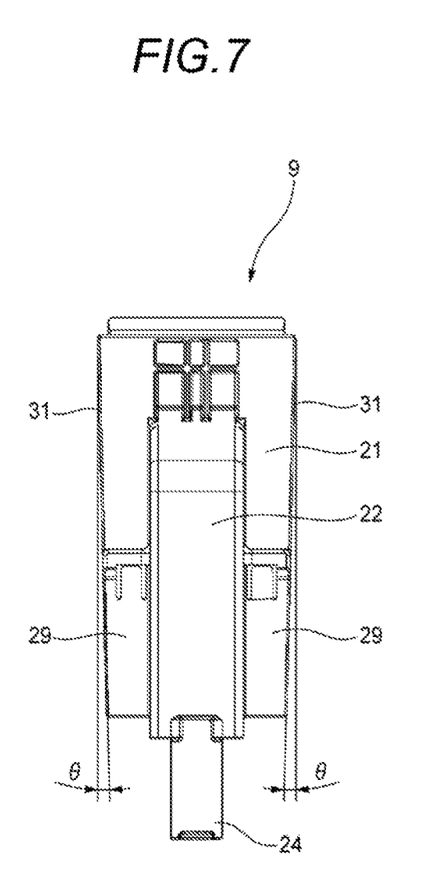
FIG. 7 is a plan view of the side cover.

The pair of end edge portions 31 on both sides in the width direction of the side cover 9 is configured by a pair of end edge portions on both sides in the width direction of the flat plate portion 21 and a pair of end edge portions on both sides in the width direction of the pair of locking portions 29 (particularly, see FIGS. 6 and 8). Like the pair of facing surfaces 11 of the frame 2, each of the pair of end edge portions 31 is a flat surface extending while inclining by an angle θ with respect to the upper-lower direction so that a distance between the end edge portions 3 gradually decreases toward the lower side. The structures of the frame 2 and the side cover 9 are described above.

Next, a procedure for assembling the side cover 9 to the frame 2 will be described. When assembling the side cover 9 to the frame 2 the side cover 9 is brought close to the upper part, of the frame 2 where the side cover 9 is to be fit, and lower end portions of the pair of end edge portions 31 of the side cover 9 are made to face the upper end portions of the pair of facing surfaces 11 of the frame 2 in the width direction.

In this state, the pair of water stop plates 25 of the side cover 9 and the pair of grooves 16 of the frame 2 coincide with each other in position in the width direction (see FIG. 11), and the pair of water stop plates 14 of the frame 2 and the pair of grooves 27 of the side cover 9 coincide with each other in position in the width direction (see FIG. 10). Further, the through holes 29a of the pair of locking portions 29 of the side cover 9 and the pair of locking pieces 17 of the frame 2 are coaxially positioned in the upper-lower direction.

Next, the side cover 9 is slid downward with respect to the frame 2 from this state. In this process, the pair of water stop plates 25 of the side cover 9 enters the pair of grooves 16 of the frame 2 from the upper side, and the pair of water stop plates 14 of the frame 2 enters the pair of grooves 27 of the side cover 9 from the upper side. Further, since both of the pair of end edge portions 31 and the pair of facing surfaces 11 are inclined by the angle θ with respect to the upper-lower direction such that the distances between the end edge portions 31 and between the pair of facing surfaces 11 gradually decrease toward the lower side, the distances between the pair of edge portions 31 and between the pair of facing surfaces 11 are gradually narrowed. Further, the pair of locking pieces 17 is inserted into the pair of through holes 29a.

When the side cover 9 reaches an assembly completion position, the pair of locking pieces 17 are locked to the pair of through, holes 29a. In addition, the pair of edge portions 31 are respectively (in the plane) in contact with the pair of facing surfaces 11 and are maintained in a pressed state due to a so-called wedge effect. For this reason, the occurrence of relative movement (backlash) between the frame 2 and the side cover 9 can be effectively prevented. Further, the pair of end edge portions 31 and the pair of facing surfaces 11 are respectively (in the plane) in press contact with each other, so that intrusion of water through contact portions of the pair of end edge portions 31 and the pair of facing surfaces 11 can be effectively prevented.

When the assembling of the side cover 9 is completed, as shown in FIG. 10, upper regions of the pair of water stop plates 14 of the frame 2 enter the pair of grooves 27 of the side cover 9. As shown in FIG. 11, lower regions of the pair of water stop plates 25 of the side cover 9 enter the pair of grooves 16 of the frame 2, and the pair of water stop ribs 28 of the side cover 9 is in press contact with respective lower regions on inner side surfaces in the width direction of the pair of water stop plates 14 of the frame 2. As described above, when the assembling of the side cover 9 is completed, a pair of "water stop structural units" extending in the upper-lower direction is configured.

In a lower region (first region) of the pair of water stop structural units, as shown in FIG. 11, the water stop function is exhibited by the pair of water stop ribs 28 that is in press contact with the inner side surface of the pair of water stop plates 14 in the width direction (first water stop structure by the press contact). Further, in an upper region (second region) of the pair of "water stop structural unit", as shown in FIG. 10, the water stop function is exhibited by a labyrinth structure in which the water stop plate 14 enters the groove 27 so that a water entering path (creeping distance) is lengthened (second water stop structure by securing the creeping distance).

In general, when the second water stop structure by securing the creeping distance is adopted, the water stop property of the water stop structural unit is increased since the water entering path (creeping distance) is lengthened as compared with the case where the first water stop structure by press contact is adopted. On the other hand, when the second water stop structure by securing the creeping distance is adopted, it is necessary to adjust the relative position and relative posture of the frame 2 and the side cover 9 so as to allow the water stop plate to enter the groove, and the assembling property of the side cover 9 to the frame 2 is likely to be lowered. On the contrary, when the first water stop structure by press contact is adopted, the assembling property of the side cover 9 to the frame 2 is increased as compared with the case where the second water stop structure by securing the creeping distance is adopted. In addition, as compared with the case where the second water stop structure by securing the creeping distance in the lower region of the water stop structural unit is adopted, when the first water stop structure by press contact in the lower region of the water stop structural unit is adopted, it is easier to push the side cover 9 into the frame 2, and to improve the assembling property of the side cover 9 to the frame 2.

From the above, according to the configuration, the assembling property of the side cover 9 to the frame 2 can be increased by adopting the first water stop structure by press contact in the lower region of the water stop structural unit, and the water stop property of the water stop structural unit can be improved by adopting the second water stop structure by securing a first creeping distance in the upper region of the water stop structural unit.

Further, in the lower region (first region) of the pair of water stop structural unit, as shown in FIG. 11, in addition to the first water stop structure, the water stop function is also exhibited by a labyrinth structure in which the water stop plate 25 enters the groove 16 so that a water entering path (creeping distance) is lengthened (third water stop structure by securing the creeping distance).

Therefore, even in the lower region of the water stop structural unit where the first water stop structure by the press contact that tends to be inferior in water stop property is adopted, the water stop property can be further improved by using the third water stop structure by ensuring the creeping distance. As a result, the water stop property of the entire water stop structural unit extending in the upper-lower direction can be further improved.

Other Embodiments

The present invention is not limited to the above embodiment and various modifications can be adopted within the scope of the present invention. For example, the present invention may be appropriately modified, improved or the like. Additionally, materials, shapes, sizes, numbers, arrangement locations, and the like of elements in the above embodiments are optional and are not limited as long as the present invention can be implemented.

In the above embodiment, in the lower region of the stop structural unit where the first water stop structure by the press contact that tends to be inferior in water stop property is adopted, the third water stop structure by ensuring the creeping distance is further added. However, the third water stop structure by securing the creeping distance may not be added in the lower region of the water stop structural unit.

Further, in the above embodiment, at the lower region of the pair of water stop structural units, a "water stop rib" (water stop rib 28) of the side cover 9 is brought into press contact with a "water stop surface" (inner side surface of the water stop plate 14 in the width direction) of the frame 2 to form the first water stop structure by press contact. However, the first water stop structure by press contact may also be formed by a "water stop rib" of the frame 2 being brought into press contact with a "water stop surface" of the side cover 9.

Further, in the above embodiment, the resin structure 1 is a relay box (electric connection box) drat accommodates a plurality of electronic components R, but the resin structure 1 may also be a structure having a function other than the relay box (electric connection box).

Herein features of the above embodiment of the resin structure 1 according to the present invention are briefly summarized and listed in the following [1] and [2].

[1] A resin structure (1) comprising:
  a first resin body (2); and
  a second resin body (9),
  wherein the second resin body (9) is fit to an outer surface of the first resin body (2) while being slid to one side in a predetermined sliding direction along the outer surface of the first resin body (2),
  wherein the first resin body (2) and the second resin body (9) form a water stop structural unit extending in the sliding direction in a state where the second min body (9) is fit to the first resin body (2), and
  wherein the water stop structural unit includes:
    a first water stop structure in a first region located at the one side in the sliding direction; and
    a second water stop structure in a second region located at the other side in the sliding direction with respect to the first region,
  wherein a water stop surface (side surface of the water stop plate 14) extending in the sliding direction and provided on one of the first resin body (2) and the second resin body (9) and a water stop rib (28) extending in the sliding direction and provided on the other of the first resin body (2) and the second resin body (9) are press contacted, in the first water stop structure, and
  wherein a first water stop plate (14) extending in the sliding direction and provided in the other resin body (9) is fit into a first groove (27) extending in the sliding direction and provided in the one resin body (2), in the second water stop structure.

[2] The resin structure (1) according to [1],
  wherein the water stop structural unit further includes a third water stop structure in the first region, and
  wherein a second water stop plate (25) extending in the sliding direction and provided in the other resin body (9) is lit into a second groove (16) extending in the sliding direction and provided in the one resin body (2), in the third water stop structure.

DESCRIPTION OF REFERENCE NUMERALS AND SIGNS

1 resin structure
2 frame (first resin both)
9 side cover (second resin body)
14 water stop plate (first water stop plate)
16 groove (second groove)
25 water stop plate (second water stop plate)
27 groove (first groove)
28 water stop rib

What is claimed is:

1. A resin structure comprising:
a first resin body; and
a second resin body,
wherein the second resin body is fit to an outer surface of the first resin body while being slid to one side in a sliding direction along the outer surface of the first resin body,
wherein the first resin body and the second resin body form a water stop structural unit extending in the sliding direction in a state where the second resin body is fit to the first resin body, and
wherein the water stop structural unit comprises:
  a first water stop structure in a first region located at the one side in the sliding direction; and
  a second water stop structure in a second region located at the other side in the sliding direction with respect to the first region,
wherein a water stop surface extending in the sliding direction and provided on one of the first resin body and the second resin body and a water stop rib extending in the sliding, direction and provided on the other of the first resin body and the second resin body are press contacted, in the first water stop structure, and
wherein a first water stop plate extending in the sliding direction and provided in the other resin body is fit into a first groove extending in the sliding direction and provided in the one resin body, in the second water stop structure.

2. The resin structure according to claim 1,
wherein the water stop structural unit further comprises a third water stop structure in the first region, and
wherein a second water stop plate extending in the sliding direction and provided in the other resin body is fit into a second groove extending in the sliding direction and provided in the one resin body, in the third water stop structure.

* * * * *